United States Patent
Howell et al.

(10) Patent No.: US 11,006,090 B2
(45) Date of Patent: May 11, 2021

(54) VIRTUAL WINDOW

(71) Applicant: University of Rochester, Rochester, NY (US)

(72) Inventors: John C. Howell, Jerusalem (IL); Joseph Spencer Howell, Uintah, UT (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 0 days.

(21) Appl. No.: 16/318,680

(22) PCT Filed: Aug. 4, 2017

(86) PCT No.: PCT/US2017/045452
§ 371 (c)(1),
(2) Date: Jan. 17, 2019

(87) PCT Pub. No.: WO2018/027110
PCT Pub. Date: Feb. 8, 2018

(65) Prior Publication Data
US 2019/0230332 A1    Jul. 25, 2019

Related U.S. Application Data

(60) Provisional application No. 62/371,384, filed on Aug. 5, 2016.

(51) Int. Cl.
*H04N 13/117* (2018.01)
*G06F 3/03* (2006.01)
(Continued)

(52) U.S. Cl.
CPC .......... *H04N 13/117* (2018.05); *G06F 3/011* (2013.01); *G06F 3/012* (2013.01); *G06F 3/0304* (2013.01);
(Continued)

(58) Field of Classification Search
None
See application file for complete search history.

(56) References Cited

U.S. PATENT DOCUMENTS

| 4,288,148 A | 9/1981 | Offner et al. |
| 4,870,485 A | 9/1989 | Downing et al. |

(Continued)

FOREIGN PATENT DOCUMENTS

| CA | 2984758 | 11/2016 |
| CA | 2998659 | 3/2017 |

(Continued)

OTHER PUBLICATIONS

Winscape, Available Online at http://www.rationalcraft.com/Winscape.html, Apr. 18, 2010, pp. 1-3.

(Continued)

*Primary Examiner* — Christopher G Findley
(74) *Attorney, Agent, or Firm* — Ping Wang; Morris, Manning & Martin LLP (57) ABSTRACT

The present disclosure is generally related to capturing a scene and projecting a virtual window to one or more observers. A virtual window may mimic the experience a viewer has when looking through a real window. In some embodiments, for a single observer looking at a digital display or digital screen, a head-tracking camera on the same side of the screen as the observer can determine the position of the observer relative to the screen. The camera may be a 3D camera, stereoscopic camera, a wide angle lens camera, or an array of cameras (e.g., two or more). A camera on the other side of the screen can then image the view on the other side of the screen and software can determine the correct portion of the view that should be displayed on the screen to the observer.

26 Claims, 8 Drawing Sheets

(51) Int. Cl.
*G06F 3/01* (2006.01)
*H04N 7/18* (2006.01)
*H04N 13/376* (2018.01)
*H04N 13/204* (2018.01)
*H04N 13/305* (2018.01)
*H04N 13/366* (2018.01)

(52) U.S. Cl.
CPC ........... *H04N 7/183* (2013.01); *H04N 13/204* (2018.05); *H04N 13/305* (2018.05); *H04N 13/366* (2018.05); *H04N 13/376* (2018.05)

(56) References Cited

U.S. PATENT DOCUMENTS

| | | | |
|---|---|---|---|
| 4,881,068 | A | 11/1989 | Korevaar et al. |
| 5,214,419 | A | 5/1993 | Demond et al. |
| 5,220,631 | A | 6/1993 | Grippin |
| 5,231,538 | A | 7/1993 | Anderson |
| 5,307,162 | A | 4/1994 | Schowengerdt |
| 5,627,554 | A | 5/1997 | Jefferson |
| 5,684,621 | A | 11/1997 | Downing |
| 5,745,197 | A | 4/1998 | Leung et al. |
| 5,914,807 | A | 6/1999 | Downing |
| 5,936,767 | A | 8/1999 | Favalora |
| 5,943,160 | A | 8/1999 | Downing |
| 5,956,172 | A | 9/1999 | Downing |
| 6,466,184 | B1 | 10/2002 | Whitesell et al. |
| 6,501,590 | B2 | 12/2002 | Bass et al. |
| 7,425,951 | B2 | 9/2008 | Fukushima et al. |
| 7,446,733 | B1 | 11/2008 | Hirimai |
| 7,537,345 | B2 | 5/2009 | Refai et al. |
| 7,858,913 | B2 | 12/2010 | Refai et al. |
| 8,075,139 | B2 | 12/2011 | Refai et al. |
| 8,247,755 | B2 | 8/2012 | Refai et al. |
| 8,638,498 | B2 | 1/2014 | Bohn et al. |
| 8,643,703 | B1 * | 2/2014 | Karakotsios ............. G09G 5/00 348/47 |
| 8,658,988 | B2 | 2/2014 | Betsui |
| 9,557,547 | B2 | 1/2017 | Choi et al. |
| 9,706,186 | B2 | 7/2017 | Shibazaki et al. |
| 9,787,939 | B1 * | 10/2017 | Beguin ................... H04N 7/147 |
| 9,798,153 | B2 | 10/2017 | Ide |
| 9,807,377 | B2 | 10/2017 | Hiddink et al. |
| 2002/0117605 | A1 | 8/2002 | Alden |
| 2003/0227415 | A1 | 12/2003 | Joannopoulos et al. |
| 2006/0171032 | A1 | 8/2006 | Nishioka |
| 2006/0192869 | A1 | 8/2006 | Yoshino et al. |
| 2009/0051699 | A1 | 2/2009 | Posa et al. |
| 2009/0128034 | A1 | 5/2009 | Ku |
| 2009/0310231 | A1 | 12/2009 | Maekawa |
| 2009/0316279 | A1 | 12/2009 | Bowers et al. |
| 2010/0066730 | A1 | 3/2010 | Grossman |
| 2010/0265552 | A1 | 10/2010 | Wang et al. |
| 2011/0001429 | A1 | 1/2011 | Davis |
| 2011/0304533 | A1 * | 12/2011 | Kim ........................ G02B 3/12 345/156 |
| 2012/0060177 | A1 * | 3/2012 | Stinson, III ........ H04N 21/4223 725/12 |
| 2012/0268836 | A1 | 10/2012 | Mercado |
| 2013/0341508 | A1 | 12/2013 | Betsui |
| 2014/0111479 | A1 | 4/2014 | Krah et al. |
| 2014/0176528 | A1 * | 6/2014 | Robbins ............... G02B 27/225 345/419 |
| 2015/0201133 | A1 * | 7/2015 | Newhouse ............... H04N 5/44 348/239 |
| 2015/0365642 | A1 | 12/2015 | Kline et al. |
| 2016/0021365 | A1 * | 1/2016 | Effendi ................. H04N 13/368 348/43 |
| 2016/0025956 | A1 | 1/2016 | Choi et al. |
| 2016/0150226 | A1 * | 5/2016 | Song .................... H04N 13/376 348/54 |
| 2018/0052584 | A1 | 2/2018 | Choi et al. |
| 2018/0267326 | A1 | 9/2018 | Broadbent et al. |
| 2018/0292179 | A1 | 10/2018 | Broadbent et al. |
| 2019/0141315 | A1 | 5/2019 | Broadbent et al. |

FOREIGN PATENT DOCUMENTS

| | | |
|---|---|---|
| EP | 901212 | 3/1999 |
| EP | 2876879 | 5/2015 |
| EP | 3286596 | 2/2018 |
| EP | 3292436 | 3/2018 |
| EP | 3353593 | 8/2018 |
| EP | 3494457 | 6/2019 |
| JP | 61269518 | 11/1986 |
| JP | 2001358567 | 12/2001 |
| JP | 2018524639 | 8/2018 |
| JP | 2018524952 | 8/2018 |
| JP | 2018537701 | 12/2018 |
| WO | 02067196 | 8/2002 |
| WO | 03030099 | 4/2003 |
| WO | 2014024121 | 2/2014 |
| WO | 2016179158 A2 | 11/2016 |
| WO | 2016179158 A3 | 1/2017 |
| WO | 2017007526 A2 | 1/2017 |
| WO | 2017007526 A3 | 3/2017 |
| WO | 2017053336 | 3/2017 |
| WO | 2018027110 | 2/2018 |
| WO | 2018057902 | 3/2018 |

OTHER PUBLICATIONS

U.S. Appl. No. 14/714,671, Non-Final Office Action dated May 23, 2016, 11 pages.

U.S. Appl. No. 14/714,671, Notice of Allowance dated Sep. 28, 2016, 7 pages.

U.S. Appl. No. 15/567,805, Non-Final Office Action dated Jan. 11, 2019, 36 pages.

U.S. Appl. No. 15/682,679, Restriction Requirement dated Dec. 14, 2018, 6 pages.

Cai et al., Optical Cloaking with Metamaterials, Nature Photonics, vol. 1, Apr. 2007, pp. 224-227.

Chanda et al., Large-Area Flexible 3d Optical Negative Index Metamaterial Formed by Nanotransfer Printing, Nature Nanotechnology, vol. 6, No. 7, Jul. 2011, pp. 402-407.

Chen et al., Extending the Bandwidth of Electromagnetic Cloaks, Physical Review B, vol. 76, Issue 24, 241104, Dec. 15, 2007, pp. 1-4.

Chen et al., Macroscopic Invisibility Cloaking of Visible Light, Nature Communications, vol. 2, Feb. 1, 2011, pp. 1-6.

Chen et al., Ray-Optics Cloaking Devices for Large Objects in Incoherent Natural Light, Nature Communications, vol. 4, Issue 2652, Oct. 24, 2013, pp. 1-6.

Chen et al., Transformation Optics and Metamaterials, Nature Materials, vol. 9, May 2010, pp. 387-396.

Choi et al., Digital Integral Cloaking, Optica, vol. 3, Issue 5, May 2016, pp. 536-540.

Choi et al., Paraxial Full-Field Cloaking, Optics Express, vol. 23, Issue 12, Jun. 8, 2015, pp. 15857-15862.

Choi et al., Paraxial Ray Optics Cloaking, Proceedings of SPIE, Photonic and Phononic Properties of Engineered Nanostructures V, vol. 9371, 937110, Feb. 27, 2015, pp. 1-6.

Clark et al., 1990 International Lens Design Conference Lens Design Problems: The Design of a NonLens, SPIE Proceedings, vol. 1354, 1990, pp. 555-569.

Collins, Lens-System Diffraction Integral Written in Terms of Matrix Optics, Journal of the Optical Society of America, vol. 60, Issue 9, Sep. 1970, pp. 1168-1177.

Costa et al., Achromatic Lens Based on a Nanowire Material with Anomalous Dispersion, Optics Express, vol. 20, Issue 13, Jun. 18, 2012, pp. 13915-13922.

Devaney, Nonuniqueness in the Inverse Scattering Problem, Journal of Mathematical Physics, vol. 19, Issue 7, Jul. 1978, pp. 1526-1531.

Duan et al., Geometric Optics-based Multiband Cloaking of Large Objects with the Wave Phase and Amplitude Preservation, Optics Express, vol. 22, No. 22, Nov. 3, 2014, pp. 27193-27202.

European Application No. 16787951.9, Office Action dated Dec. 6, 2018, 4 pages.

Ergin et al., Three-Dimensional Invisibility Cloak at Optical Wavelengths, Science, vol. 328, Issue 5976, Apr. 16, 2010, pp. 337-339.

(56) References Cited

OTHER PUBLICATIONS

Fleury et al., Cloaking and Invisibility: A Review, Progress in Electromagnetics Research, vol. 147, 2014, pp. 171-202.
Fleury et al., Invisibility and Cloaking: Origins, Present, and Future Perspectives, Physical Review Applied, vol. 4, Issue 3, 037001, Sep. 1, 2015, pp. 1-20.
Fridman et al., Demonstration of Temporal Cloaking, Nature, vol. 481, Jan. 5, 2012, pp. 62-65.
Gabrielli et al., Silicon Nanostructure Cloak Operating at Optical Frequencies, Nature Photonics, vol. 3, Jul. 20, 2009, pp. 1-3.
Gbur, Invisibility Physics: Past, Present, and Future, Progress in Optics, vol. 58, 2013, pp. 65-114.
Geng, Three-Dimensional Display Technologies, Advances in Optics and Photonics, vol. 5, Issue 4, Nov. 22, 2013, pp. 456-535.
Giovampaola et al., Digital Metamaterials, Nature Materials, vol. 13, Sep. 14, 2014, pp. 1-7.
Greenleaf et al., Anisotropic Conductivities that Cannot Be Detected by EIT, Physiological Measurement, vol. 24, No. 2, Apr. 30, 2003, pp. 413-419.
Greenleaf et al., Full-Wave Invisibility of Active Devices at All Frequencies, Communications in Mathematical Physics, vol. 275, Issue 3, Nov. 2007, pp. 749-789.
Greenleaf et al., Isotropic Transformation Optics: Approximate Acoustic and Quantum Cloaking, New Journal of Physics, vol. 10, Nov. 27, 2008, pp. 1-28.
Hamilton et al., Generalized Refraction Using Lenslet Arrays, Journal of Optics A: Pure and Applied Optics, vol. 11, No. 6, Mar. 19, 2009, 12 pages.
Hashemi et al., Diameter-Bandwidth Product Limitation of Isolated-Object Cloaking, Physical Review A, vol. 86, Issue 1, 013804, Jul. 5, 2012, pp. 1-8.
Howell et al., Amplitude-Only, Passive, Broadband, Optical Spatial Cloaking of Very Large Objects, Applied Optics, vol. 53, Issue 9, Mar. 20, 2014, pp. 1958-1963.
Kildishev et al., Transformation Optics: Approaching Broadband Electromagnetic Cloaking, New Journal of Physics, vol. 10, 115029, Nov. 27, 2008, pp. 1-13.
Kim et al., Three-dimensional Volumetric Display in Rubidium Vapor, SPIE, vol. 2650, Mar. 29, 1996, pp. 274-284.
Landy et al., A Full-Parameter Unidirectional Metamaterial Cloak for Microwaves, Nature Materials, vol. 12, Jan. 2013, pp. 25-28.
Leonhardt et al., Broadband Invisibility by Non-Euclidean Cloaking, Science, vol. 323, Issue 5910, Jan. 2, 2009, pp. 110-112.
Leonhardt, Optical Conformal Mapping, Science, New Series, vol. 312, Issue 5781, Jun. 23, 2006, pp. 1777-1780.
Li et al., Hiding Under the Carpet: A New Strategy for Cloaking, Physical Review Letters, vol. 101, Issue 20, 203901, Nov. 10, 2008, pp. 1-4.
Lippmann, Integral Photography, Scientific American, Aug. 19, 1911, p. 164.
Lippmann, Photography, Academy of Sciences, Reversible proofs, Full size photographs, Mar. 1908, pp. 446-451.
Liu et al., Broadband Ground-Plane Cloak, Science, vol. 323, Issue 5912, Jan. 16, 2009, pp. 366-369.
Liu et al., Three-Dimensional Photonic Metamaterials at Optical Frequencies, Nature Materials, vol. 7, Jan. 2008, pp. 31-37.
Lukens et al., A Temporal Cloak at Telecommunication Data Rate, Nature, vol. 498, Jun. 13, 2013, pp. 205-208.
Ma et al., Experiments on Active Cloaking and Illusion for Laplace Equation, Physical Review Letters, vol. 111, Issue 17, 173901, Oct. 22, 2013, pp. 1-5.
McCall, Transformation Optics and Cloaking, Contemporary Physics, vol. 54, Issue 6, Nov. 2013, pp. 273-286.
Miller, On Perfect Cloaking, Optics Express, vol. 14, Issue 25, Dec. 11, 2006, pp. 12457-12466.
Monticone et al., Do Cloaked Objects Really Scatter Less?, Physical Review X, vol. 3, 041005, Oct. 21, 2013, pp. 1-10.
Monticone et al., Physical Bounds on Electromagnetic Invisibility and the Potential of Superconducting Cloaks, Photonics and Nanostructures, vol. 12, Issue 4, Aug. 2014, pp. 330-339.
Nachman, Reconstructions from Boundary Measurements, Annals of Mathematics, vol. 128, No. 3, Nov. 1988, pp. 531-576.
Nielsen, The Digital Chameleon Principle: Computing Invisibility by Rendering Transparency, Graphically Speaking IEEE Computer Graphics and Applications, vol. 27, Issue 1, Jan./Feb. 2007, pp. 90-96.
Oxburgh et al., Transformation Optics with Windows, Proceedings of SPIE, vol. 9193, 91931E, Sep. 12, 2014, pp. 1-9.
International Application No. PCT/EP2009/004697, International Preliminary Report on Patentability dated Jan. 27, 2011, 6 pages.
International Application No. PCT/EP2009/004697, International Search Report and Written Opinion dated Oct. 27, 2009, 13 pages (7 pages for the original document and 6 pages for the English translation).
International Application No. PCT/US2016/028665, International Preliminary Report on Patentability dated Nov. 2, 2017, 8 pages.
International Application No. PCT/US2016/028665, International Search Report and Written Opinion dated Jan. 27, 2017, 12 pages.
International Application No. PCT/US2016/030542, International Preliminary Report on Patentability dated Nov. 16, 2017, 12 pages.
International Application No. PCT/US2016/030542, International Search Report and Written Opinion dated Dec. 5, 2016, 15 pages.
International Application No. PCT/US2016/030542, Invitation to Pay Additional Fees and Partial Search Report dated Sep. 6, 2016, 6 pages.
International Application No. PCT/US2016/052738, International Preliminary Report on Patentability dated Apr. 5, 2018, 11 pages.
International Application No. PCT/US2016/052738, International Search Report and Written Opinion dated Jan. 31, 2017, 17 pages.
International Application No. PCT/US2016/052738, Invitation to Pay Additional Fees and Partial Search Report dated Dec. 6, 2016, 5 pages.
International Application No. PCT/US2017/045452, International Search Report and Written Opinion dated Oct. 16, 2017, 12 pages.
International Application No. PCT/US2017/045452, International Preliminary Report on Patentability dated Feb. 14, 2019, 7 pages.
International Application No. PCT/US2017/052972, International Search Report and Written Opinion dated Dec. 7, 2017, 19 pages.
Pendry et al., Controlling Electromagnetic Fields, Science, vol. 312, Issue 5781, Jun. 23, 2006, pp. 1780-1782.
Platt et al., History and Principles of Shack-Hartmann Wavefront Sensing, Journal of Refractive Surgery, vol. 17, Sep./Oct. 2001, pp. S573-S577.
Schittny et al., Invisibility Cloaking in a Diffusive Light Scattering Medium, Science, vol. 345, Issue 6195, Jul. 25, 2014, 4 pages.
Schurig et al., Metamaterial Electromagnetic Cloak at Microwave Frequencies, Science, vol. 314, Issue 5801, Nov. 10, 2006, pp. 1-8.
Shelby et al., Experimental Verification of a Negative Index of Refraction, Science, vol. 292, Issue 5514, Apr. 6, 2001, pp. 77-79.
Silveirinha, Anomalous Refraction of Light Colors by a Metamaterial Prism, Physical Review Letters, vol. 102, 193903, May 14, 2009, p. 1-4.
Smolyaninov et al., Anisotropic Metamaterials Emulated by Tapered Waveguides: Application to Optical Cloaking, Physical Review Letters, vol. 102, Issue 21, May 29, 2009, 4 pages.
Smolyaninov et al., Two-Dimensional Metamaterial Structure Exhibiting Reduced Visibility at 500 nm, Optics Letters, vol. 33, Issue 12, Jun. 15, 2008, pp. 1342-1344.
Soukoulis et al., Past Achievements and Future Challenges in 3D Photonic Metamaterials, Nature Photonics, vol. 5, 2011, pp. 1-18.
Soukoulis et al., Past Achievements and Future Challenges in the Development of Three-Dimensional Photonic Metamaterials, Nature Photonics, vol. 5, Sep. 2011, pp. 523-530.
Szczys, Virtual Windows that Track a Viewer's Position, Available Online at http://hackaday.com/2010/04/16/virtual-windows-that-track-a-viewers-position, Apr. 16, 2010, 11 pages.
Theisen et al., Optical Properties of Gallium Implanted Silicon, Frontiers in Optics/Laser Science Technical Digest, Optical Society of America, Oct. 14-18, 2012, 2 pages.
Valentine et al., An Optical Cloak Made of Dielectrics, Nature Materials, vol. 8, Jul. 2009, pp. 568-571.

(56) References Cited

OTHER PUBLICATIONS

Valentine et al., Three-Dimensional Optical Metamaterial with a Negative Refractive Index, Nature, vol. 455, Sep. 18, 2008, pp. 376-379.
Vasquez et al., Active Exterior Cloaking for the 2D Laplace and Helmholz Equations, Physical Review Letters, vol. 103, May 28, 2009, pp. 1-4.
Veselago, The Electrodynamics of Substances with Simultaneously Negative Values of Sigma and Mu, Soviet Physics USPEKHI, vol. 10, No. 4, Jan.-Feb. 1968, pp. 509-514.
Wolf et al., Invisible Bodies and Uniqueness of the Inverse Scattering Problem, Journal of Modern Optics, vol. 40, Issue 5, May 1993, pp. 785-792.
Xiao et al., Advances in Three-Dimensional Integral Imaging: Sensing, Display, and Applications, Applied Optics, vol. 52, No. 4, Feb. 1, 2013, pp. 546-560.
Zhai et al., An Effective Broadband Optical 'Cloak' Without Metamaterials, Laser Physics Letters, vol. 10, No. 6, Apr. 18, 2013, pp. 1-5.
Zhang et al., Macroscopic Invisibility Cloak for Visible Light, Physical Review Letters, vol. 106, 033901, Jan. 18, 2011, pp. 1-4.
U.S. Appl. No. 15/682,679, Notice of Allowance dated Aug. 22, 2019, 8 pages.
U.S. Appl. No. 15/571,514, Non-Final Office Action dated May 17, 2019, 18 pages.
International Application No. PCT/US2017/052972, International Preliminary Report on Patentability dated Apr. 4, 2019, 12 pages.

\* cited by examiner

VIRTUAL WINDOW

CROSS REFERENCE TO RELATED APPLICATION

This application claims the benefit of the filing date of and priority to U.S. provisional patent application Ser. No. 62/371,384, filed Aug. 5, 2016 for a "Virtual Window," the entire contents of which are incorporated by this reference.

BACKGROUND OF THE DISCLOSURE

It may be desirable to capture a scene and project a virtual window to one or more observers. Embodiments disclosed herein address various difficulties associated with such a concept.

SUMMARY OF THE DISCLOSURE

The present disclosure is generally related to capturing a scene and projecting a virtual window to one or more observers.

The disclosure will be better understood upon reading the following description and examining the figures which accompany it. These figures are provided by way of illustration only and are in no way limiting on the disclosure.

In one example, a method for creating a virtual window includes: determining a position of an observer relative to a virtual window display; capturing image data of a field of view of a scene; using a computer processor, determining, based on the position of the observer relative to the virtual window display, a portion of the field of view that corresponds to a solid angle of the virtual window display subtended by the observer; and displaying the portion of the field of view on the virtual window display.

In some instances, determining the position of the observer relative to the virtual window display is determining an angular position of the observer relative to the virtual window display and determining a distance of the observer relative to the virtual window display.

In some instances, data captured by a stereoscopic camera or a 3D camera is used to determine the position of the observer relative to the virtual window display.

In some instances, the stereoscopic camera or the 3D camera is used to determine the position of a face or eyes of the observer relative to the virtual window display.

In some instances, the captured image data of the field of view of the scene is stereoscopic image data.

In some instances, the virtual window display includes a lenticular lens array over a display screen.

In some instances, the virtual window display displays a first image portion visible to a right eye of the observer and a second image portion visible to a left eye of the observer.

In some instances, the virtual window display is located on a first side of a structure obstructing the observer from viewing the scene and wherein the image data is captured from a second side of the structure.

In some instances, the image data is captured by at least one camera that is centrally located relative to the virtual window display.

In some instances, the image data is captured by at least one camera that is centrally located behind the virtual window display.

In some instances, the computer processor, in response to a change in position of the observer relative to the virtual window display, causes a change in which portion of the field of view is displayed on the virtual window display.

In some instances, the captured image data is three dimensional or stereoscopic image data, and the computer processor, in response to a change in position of the observer relative to the virtual window display, causes a change in which portion of the field of view is displayed on the virtual window display and causes a parallax change in the portion of the field of view being displayed.

In some instances, the image data is captured using a 3D camera, a stereoscopic camera, a wide angle lens camera, an array of cameras, or at least one movable camera.

In another example, a method for creating a virtual window includes: determining a position of a first observer relative to a virtual window display, the virtual window display located on a first side of a structure, the structure obstructing the first observer from viewing a scene; capturing image data of a field of view of the scene using at least one camera located on a second side of the structure; using a computer processor, determining, based on the position of the first observer relative to the virtual window display, a first portion of the field of view that corresponds to a solid angle of the virtual window display subtended by the first observer; and displaying the first portion of the field of view on the virtual window display, wherein the virtual window display mimics a view the first observer would have if the virtual window was a real window in the structure.

In some instances, the virtual window display comprises a lenticular lens array over a display screen.

In some instances, the method further includes: determining a position of a second observer relative to the virtual window display; using the computer processor, determining, based on the position of the second observer relative to the virtual window display, a second portion of the field of view that corresponds to a second solid angle of the virtual window display subtended by the second observer; and displaying the first portion and the second portion of the field of view on the virtual window display such that the first portion is viewable from the position of the first observer and the second portion is viewable from the position of the second observer, wherein the virtual window display mimics views the observers would have if the virtual window was a real window in the structure.

In some instances, displaying the first portion of the field of view is done by displaying the first portion of the field of view using pixel columns of the lenticular lens array viewable from the first observer's position, and displaying the second portion of the field of view is done by displaying the second portion of the field of view using different pixel columns of the lenticular array visible from the second observer's position.

In some instances, the scene includes at least one object, and the computer processor is configured to adjust at least one of a size and a position of the object in the displayed first portion of the field of view based on the determined position of the first observer.

In some instances, the method further includes obtaining secondary image data of the scene, adjusting at least one of the size and the position of the object creates a gap in the displayed first portion of the field of view, and the computer processor is configured to fill in the gap using the secondary image data.

In another example, a virtual window system includes: a virtual window display; a position sensor configured to determine a position of an observer relative to the virtual window display; at least one camera configured to capture image data of a field of view of a scene; a computer processor configured to determined, based on the position of the observer relative to the virtual window display, a portion of the field of view that corresponds to a solid angle of the virtual window display subtended by the observer; and the virtual window display is configured to display the portion of the field of view on the virtual window display such that the virtual window display mimics a view the observer would have if the virtual window was a real window.

In some instances, the virtual window display includes a lenticular lens array over a display screen.

BRIEF DESCRIPTION OF THE DRAWINGS

Further details, aspects, and embodiments of the disclosure will be described by way of example only and with reference to the drawings. In the drawings, like reference numbers may be used to identify like or functionally similar elements. Elements in the figures may be illustrated for simplicity and clarity and have not necessarily been drawn to scale.

DETAILED DESCRIPTION OF THE DISCLOSURE

Figure 1:
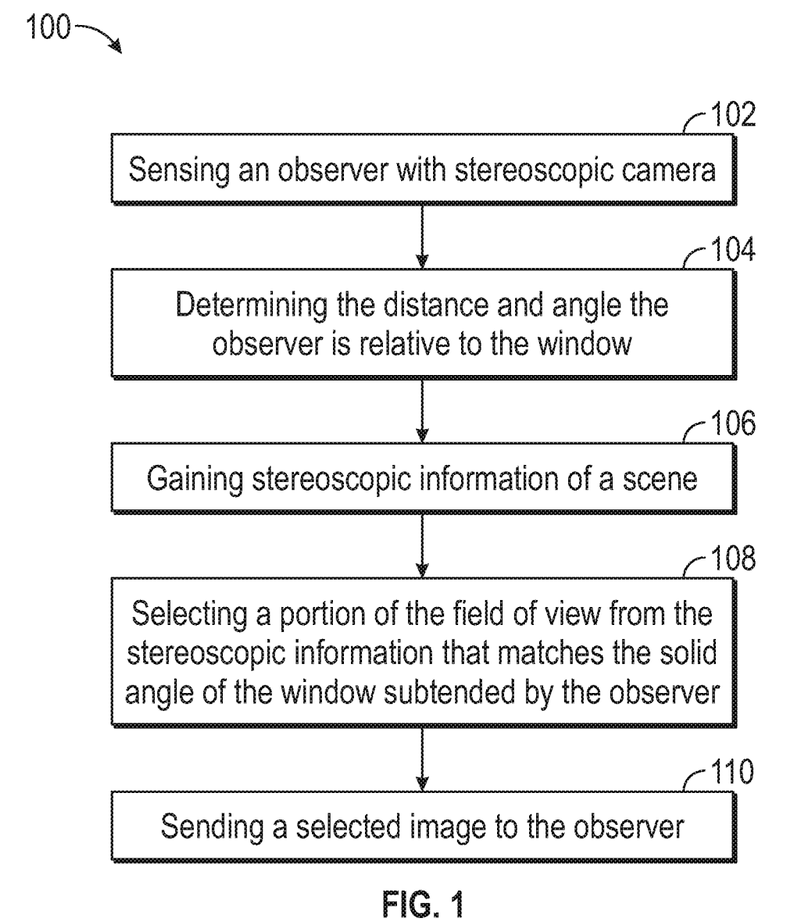
FIG. 1 shows an exemplary method for creating a virtual window according to some embodiments of the disclosure.

FIG. 1 shows an exemplary method 100 for creating a virtual window according to some embodiments. The method 100 may include sensing an observer with a stereoscopic camera 102. The observer distance and angle relative to the window may be determined 104. Stereoscopic information of the scene may be captured 106. Thereafter, a portion of the field of view from the captured stereoscopic information is selected that matches the solid angle of the window subtended by the observer 108. A selected image may be sent to the observer 110 that is associated with the selected portion of the field of view.

In certain embodiments, a virtual window mimics the experience a viewer has when looking through a real window. By adjusting one's relative position to the window, the field of view and the parallax of the view changes for the observer. In some embodiments, for a single observer looking at a digital display or digital screen, a head-tracking camera or cameras on the same side of the screen as the observer, can determine the position of the observer relative to the screen.

A camera on the other side of the screen can then image the view on the other side of the screen. Software calculates the distance of the observer, and then determines the field of view and the correct portion of the view that should be displayed on the screen for that given distance. The camera may be a 3D camera, stereoscopic camera, a wide angle lens camera, or an array of cameras (e.g., two or more). In some embodiments, the one or more cameras may be mounted on a slider, as will be discussed in further detail below. Additionally, in some embodiments, a single 3D camera may be provided and approximately centered on the virtual window.

Figure 2:
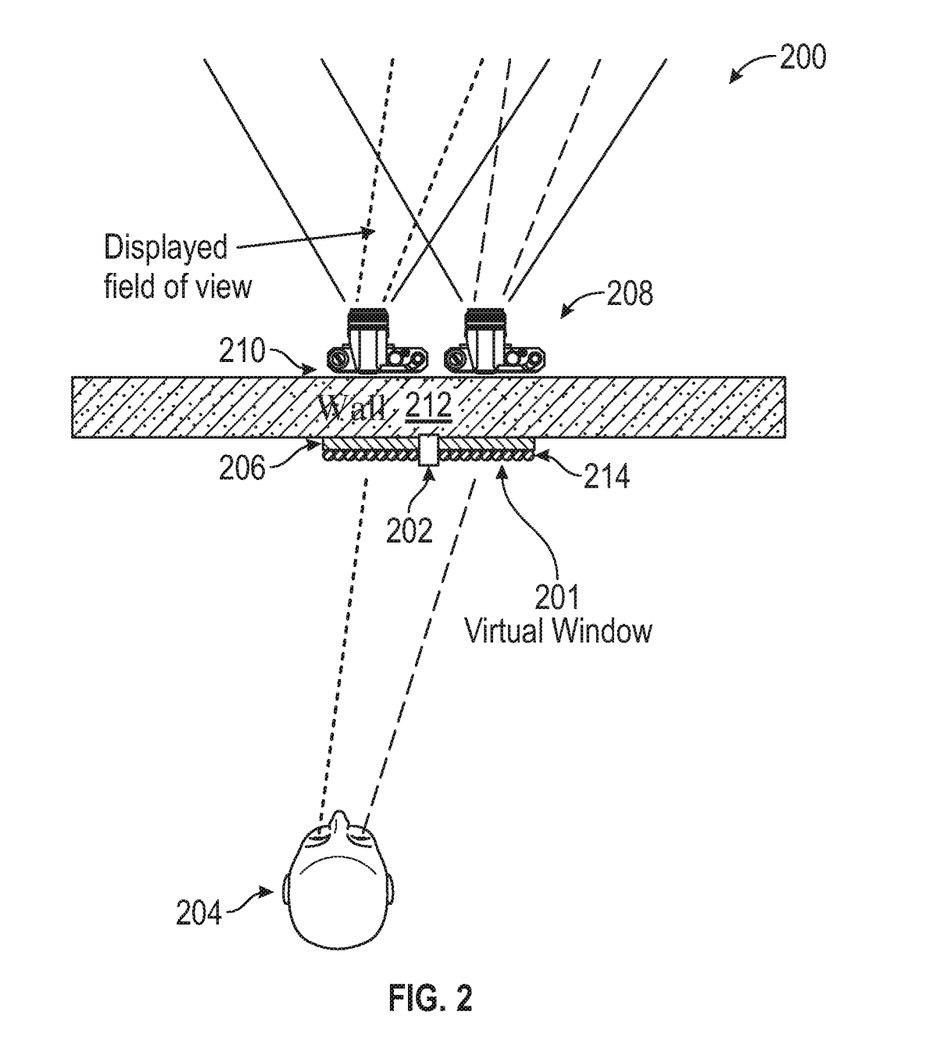
FIG. 2 shows a system for creating a virtual window according to some embodiments of the disclosure.

FIG. 2 shows an exemplary system 200 for creating a virtual window 201 according to some embodiments of the disclosure. System 200 includes a 3D camera or stereoscopic camera 202 such as the Intel RealSense or the Microsoft Kinect for sensing an observer 204. The camera 202 can determine (e.g., via facial or eye recognition or the like) the distance and angle the observer 204 is relative to the window 201. The relative position of the observer 204 is then fed back into the display 206, which has a central processor (e.g., iPad or tablet). Two cameras 208, 210 on the other side of a wall 212 are gaining stereoscopic information of a scene. The facial recognition camera 202 feedback selects the portion of the field of view from the cameras 208 that matches the solid angle of the window 201 subtended by the observer 204. The selected image from the right camera 208 is sent to the right eye and the image from the left camera 210 is sent to the left eye using a lenticular lens 214 atop a high-resolution projection system of display 206

A lenticular display (formed by lens 214 in combination with display 206) has many slant pixels on which to send information. By knowing the relative position of the observer 204, the processor, such as an iPad, determines which set of slant pixels the left and right images should be conveyed on. For example, a 30 LPI lens atop an iPad mini has 31 slant pixels per lens. By knowing the relative position of the observer 204, the appropriate images can be conveyed on slant pixels 8 and 11, for example. If another observer looks at the window, feedback could show images for that observer on slant pixels 14 and 17, as an example. While illustrated with two cameras 208, 210, it should be understood that one or more cameras may be used for capturing the scene in embodiments of the disclosure.

For most observers, parallax problems will be minimal, especially when the wall thickness is small. Parallax problems could be more problematic when precise position is desired or when wall thickness is large. For larger wall thicknesses, a relative movement of the observer will make it so that there is a shift in the ray propagation from the scene to the observer. This can be compensated by putting the two-camera system on a 2-dimensional slider.

In some embodiments, to increase speed and/or to eliminate moving parts, an array of cameras may be used on the other side of wall 212 and only the cameras that correspond to the relative position of the observer 204 are engaged.

In some embodiments, a multiple viewer virtual window may be provided. This problem can be addressed, in certain embodiments, by using facial tracking of multiple observers along with lenticular lenses and then sending the correct portion of the view to each observer for their relative position to the screen.

Figure 3:
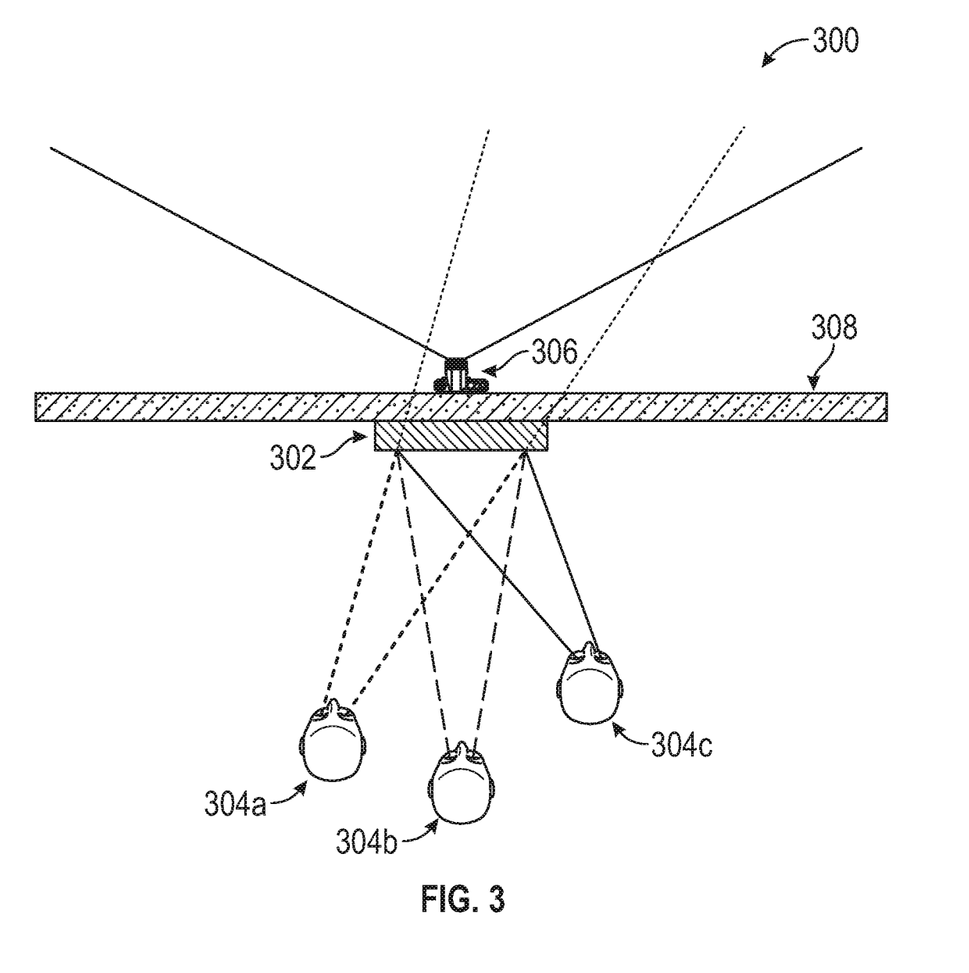
FIG. 3 illustrates an exemplary multiple viewer virtual window, according to some embodiments.

Suppose there are multiple observers looking at the screen. Head tracking hardware and software determines the distance of each observer. A high-resolution, wide-angle camera on the back of the screen images the scene. The software determines the portion of the view for each observer. A lenticular lens array allows the display to send the view to each observer without compromising the view of the other observers. FIG. 3 illustrates an exemplary multiple viewer virtual window 300. Three observers 304a, 304b, 304c are viewing a digital display 302. A wide-angle camera 306 on the other side of a wall 308 images a scene. Using a lenticular lens array (not shown) on the display 302, the appropriate scene for each observer 304a, 304b, 304c is displayed.

The state-of-the-art commercial digital displays have a resolution of almost 500 pixels per inch. By performing sub-pixel interlacing, the horizontal slant pixel density increases to more than 1500 slant pixels per inch. Using a 60 lens per inch lenticular array would give more than 25 slant pixel columns per lens.

For a simple example, with three viewers equally distant from the screen, one could then divide the slant pixel columns into thirds. Software would then determine the portion of the scene that should be sent to the first viewer. That view would then be repeated on, for example, slant columns 1 to 8 for each lens. The view for the second observer could be sent on pixels 9 through 16 and so on.

As a more general example as shown in FIG. 3, each observer 304a, 304b, 304c would have a solid angle over which his/her view would need to be displayed. The needed view for each observer is computed in the software. The software determines the number of and which views would be needed for each observer 304a, 304b, 304c to send the scene to that viewer 304a, 304b, 304c.

In some embodiments, the scene-capturing camera (e.g., camera 306) may be positioned on the wall (e.g., wall 308) such that it is centered relative to the virtual window created by the display (e.g., display 302). Such placement of the scene-capturing camera may shift any warping effect errors such that the error is balanced on both sides, instead of getting a larger warping effect that favors one side over the other. The warping effect may due to non-parallel frustums, an example of which is illustrated with reference to FIG. 4.

Figure 4:
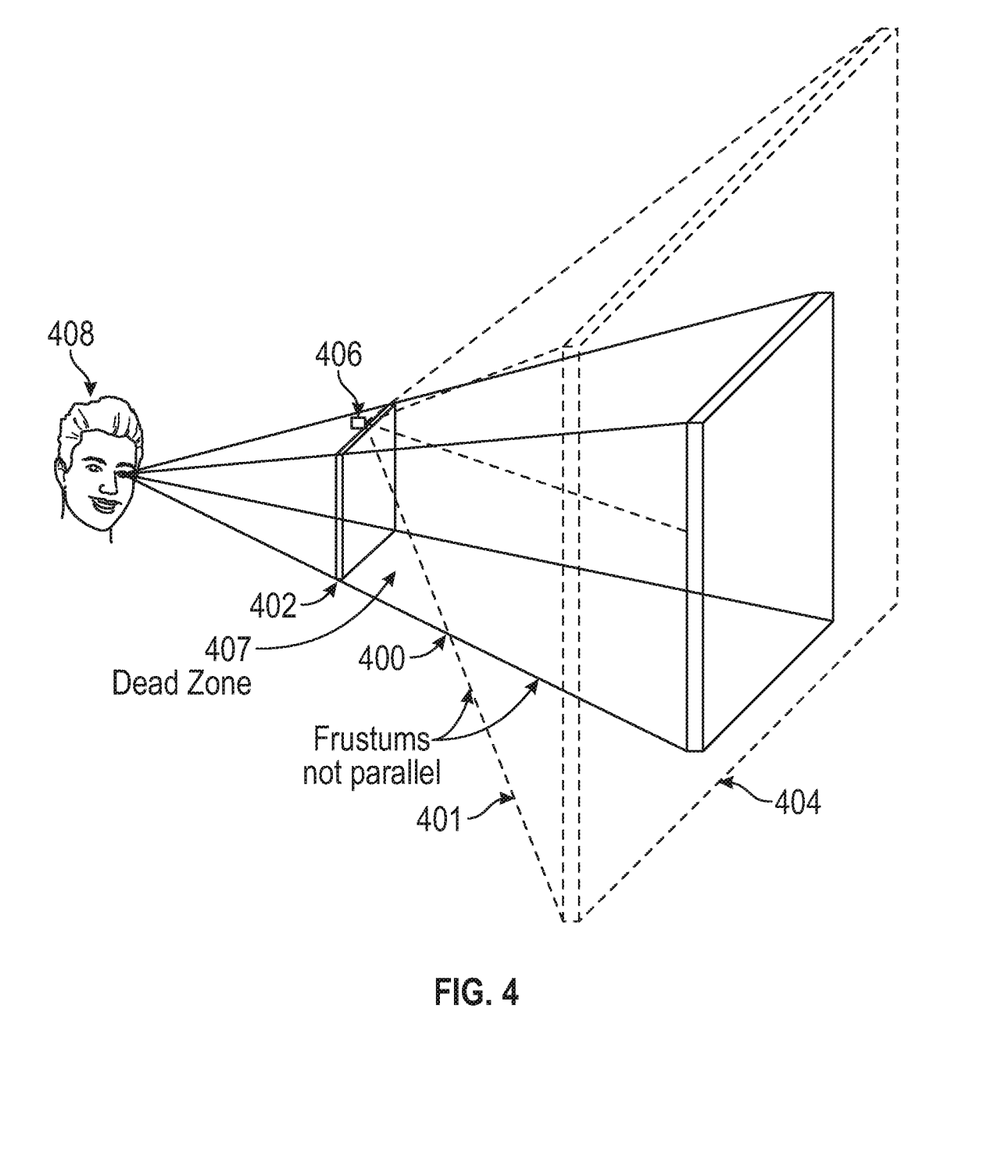
FIG. 4 illustrates an example of non-parallel frustums which may lead to a warping effect.

The frustum 400 from the virtual window 402 to the focal plane 404 is what should be projected onto the screen of the virtual window. However, the frustum 401 from the scene-capturing camera 406 to the focal plane 404, is what can be projected onto the screen. In this configuration there may be a dead zone 407 immediately behind the screen of virtual window 402. Anything within this area will be missed by camera 406, even though the observer 408 thinks he should see it.

Figure 5A:
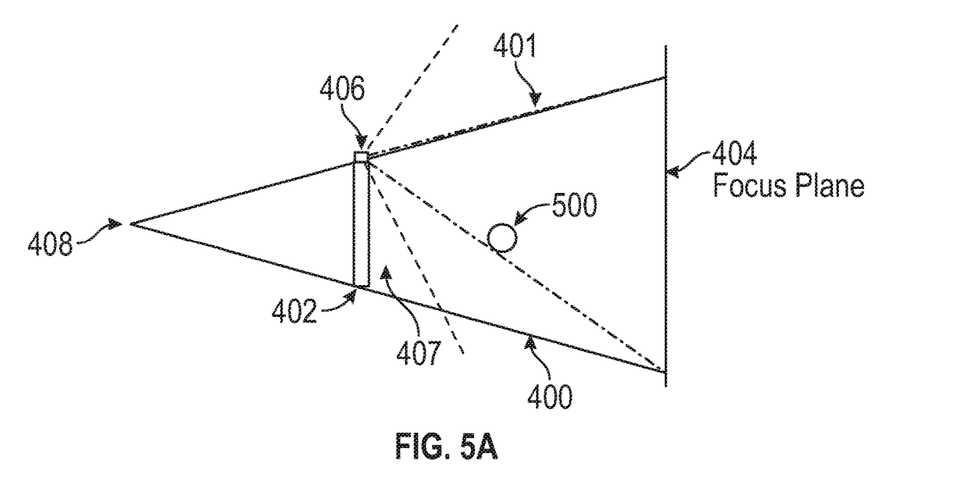
FIGS. 5A-5C illustrate an example of warping.
Figure 5B:
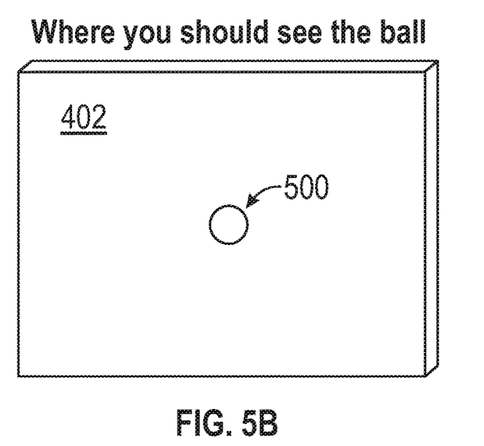
Figure 5C:
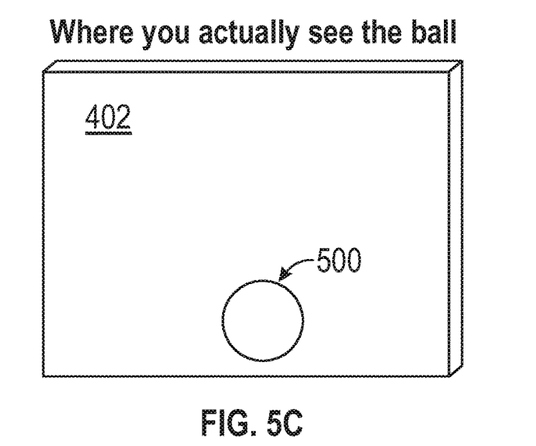
Figure 6A:
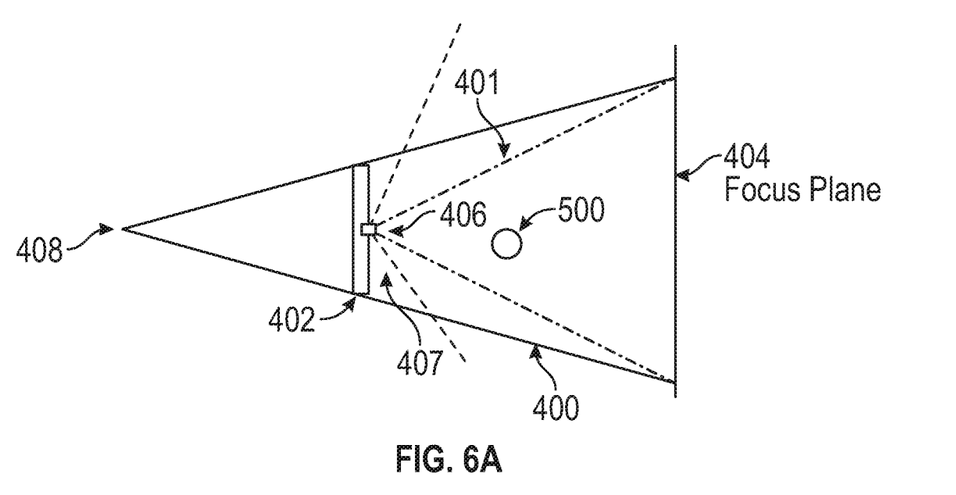
FIGS. 6A-6B illustrate the setup of FIG. 5A further modified to balance warping errors.
Figure 6B:
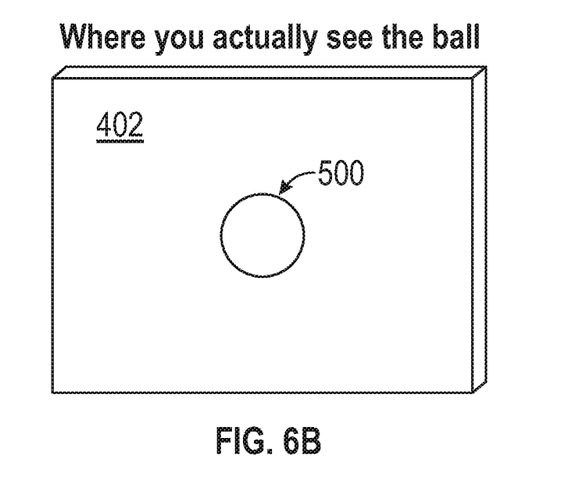

Additionally, with non-parallel frustums, objects closer to the camera 406 can become warped, as illustrated in the example situation illustrated in FIGS. 5A-5C. FIG. 5A illustrates a side view of the setup illustrated in FIG. 4 and a situation where an object 500 is close to and centered with the window 402. Put in another way, the object 500 may be centered in frustum 400. In contrast, the object 500 is just inside the frustum 401 (associated with camera 406) and near its bottom edge. Accordingly, FIG. 5B illustrates what should be projected onto the screen 402. However, due to warping, FIG. 5C illustrates where the object 500 would be projected. As illustrated, in some embodiments, the object 500 would appear larger. As mentioned above, in some embodiments, the scene-capturing camera may be centered relative to the virtual window such that the warping effect errors are shifted and balanced on both sides. FIG. 6A illustrates a side view of the setup illustrated in FIG. 5A, except with a centered camera 406, and where an object 500 is close to and centered with window 402. FIG. 6B shows how object 500 would be projected in the setup illustrated in FIG. 6A. As can be seen, the projection of object 500 is centered in contrast to the projection illustrated in FIG. 5C.

In some embodiments, the scene-capturing camera (e.g., camera 306, 406) may be a 3D camera. A 3D camera not only captures image data, but also 3D positioning in the captured scene. If the 3D camera were implemented in the setup illustrated in FIG. 6A, the object 500 would be captured as a 3D object with a mesh. The object may then be projected appropriately into the frustum 400 and it would be projected in the correct size for the observer. In such an implementation, the focus plane 404 and frustum 401 may not be needed if the 3D camera collects all the image and 3D positioning data.

Figure 7:
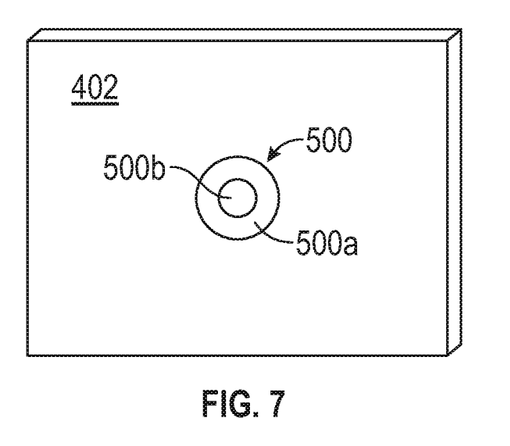
FIG. 7 illustrates an exemplary projection if the setup illustrated in FIG. 6A utilized a 3D centered camera.
Figure 8:
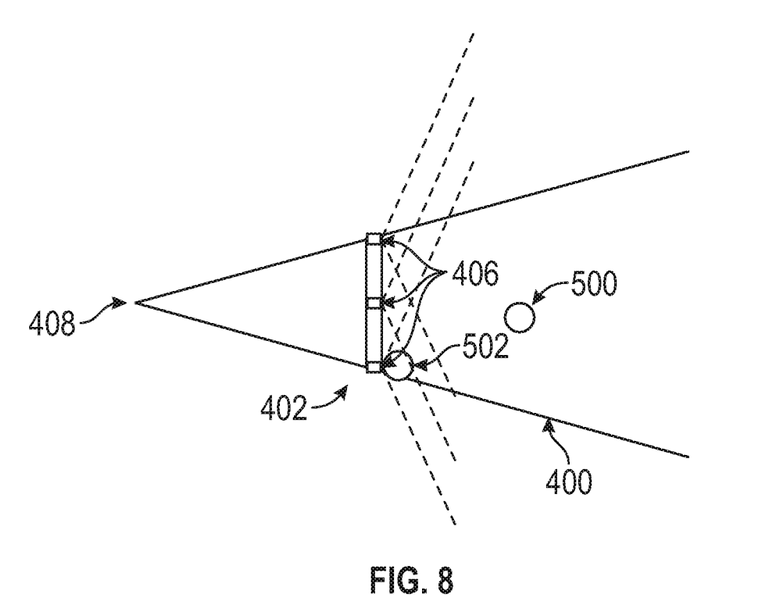
FIG. 8 illustrates the setup of FIG. 6A, further modified with a plurality of cameras.

In some embodiments, historical and external data may be captured. For example, the virtual window program may be continually scanning the room. Any changes to the room could be kept in a database. In certain embodiments, only changes in the image data may be recorded (e.g., movement of a chair), so as to limit data usage as all frames captured from the camera are not needed. Such historical data may complete a picture of a scene in 3D. Optionally, a user may complete a scan of the room first to fill in missing portions of the image. For example, FIG. 7 illustrates an exemplary projection if the setup illustrated in FIG. 6A utilized a 3D centered camera 406. If the object 500 is re-projected such that it is in the frustum 400 in the appropriate size and location, some scene data may be missing from the projection. The black area 500a is where the object 500 would be according to a non-3D camera and the central spot 500b is after re-projection. Accordingly, after re-projection of object 500 to the appropriate size 500b, a portion 500a of the scene is missing. This missing portion 500a, may be filled using the historical data or a prior scan of the scene. In some embodiments, the gaps in scene data may be filled with scene data from other sources such as satellite imagery, topographical data, Google street view, etc. Optionally multiple cameras may be utilized. For example, FIG. 8 illustrates the setup of FIG. 6A, further modified with a plurality of cameras 406. The multiple cameras 406 may fill in some gaps where one 3D camera couldn't see. Additionally the multiple cameras 406 may reduce the dead-zone associated with a single camera. A grid of wide-FOV cameras may cooperate to fit objects undetected by other cameras it into the scene, thereby reducing the dead zone associated with the system. For example, in the setup illustrated in FIG. 8, a grid of 9 cameras may be used (e.g., 3 columns of 3 cameras each). From the center or top camera, the object 502 would be invisible, even though it should technically be visible within the frustum 400. The object 502 may however be captured by the bottom camera. Thereafter, both the object 500 and the object 502 may be fit into the scene projected by virtual window 402.

Embodiments of the virtual window may be used in an enclosed transportation module, such as a hyperloop pod.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific circuits. Combinations of computer-executed software and hard-wired logic or other circuitry may be suitable as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to, diskettes, drives, and other magnetic-based storage media, optical storage media, including disks (e.g., CD-ROMS, DVD-ROMS, variants thereof, etc.), flash, RAM, ROM, and other memory devices, and the like.

The subject matter of embodiments of the present invention is described here with specificity, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method for creating a virtual window which mimics a view an observer would have if the virtual window was a real window through a structure, the method comprising:
   determining a position of an observer relative to a virtual window display;
   capturing image data of a field of view of a scene;
   using a computer processor, determining, based on the position of the observer relative to the virtual window display, a portion of the field of view that corresponds to a solid angle of the virtual window display subtended by the observer; and
   displaying the portion of the field of view on the virtual window display;
   wherein the scene comprises at least one object,
   wherein the computer processor is configured to adjust at least one of a size and a position of the object relative to other parts of the scene in the displayed portion of the field of view based on the determined position of the first observer.

2. The method of claim 1, wherein determining the position of the observer relative to the virtual window display comprises determining an angular position of the observer relative to the virtual window display and determining a distance of the observer relative to the virtual window display.

3. The method of claim 2, wherein data captured by a stereoscopic camera or a 3D camera is used to determine the position of the observer relative to the virtual window display.

4. The method of claim 3, wherein the stereoscopic camera or the 3D camera is used to determine the position of a face or eyes of the observer relative to the virtual window display.

5. The method of claim 3, wherein the captured image data of the field of view of the scene is stereoscopic image data.

6. The method of claim 5, wherein the virtual window display comprises a lenticular lens array over a display screen.

7. The method of claim 6, wherein the virtual window display displays a first image portion visible to a right eye of the observer and a second image portion visible to a left eye of the observer.

8. The method of claim 1, wherein the virtual window display is located on a first side of a structure obstructing the observer from viewing the scene and wherein the image data is captured at a second side of the structure.

9. The method of claim 8, wherein the image data is captured by at least one camera that is centrally located relative to the virtual window display.

10. The method of claim 8, wherein the image data is captured by at least one camera that is centrally located behind the virtual window display.

11. The method of claim 1, wherein the computer processor, in response to a change in position of the observer relative to the virtual window display, causes a change in which portion of the field of view is displayed on the virtual window display.

12. The method of claim 1, wherein the captured image data comprises three dimensional or stereoscopic image data, and wherein the computer processor, in response to a change in position of the observer relative to the virtual window display, causes a change in which portion of the field of view is displayed on the virtual window display and causes a parallax change in the portion of the field of view being displayed.

13. The method of claim 1, wherein the image data is captured using a 3D camera, a stereoscopic camera, a wide angle lens camera, an array of cameras, or at least one movable camera.

14. The method of claim 1, further comprising obtaining secondary image data of the scene, wherein adjusting at least one of the size and the position of the object creates a gap in the displayed first portion of the field of view, wherein the computer processor is configured to fill in the gap using the secondary image data.

15. A method for creating a virtual window, the method comprising:
   determining a position of a first observer relative to a virtual window display, the virtual window display located on a first side of a structure, the structure obstructing the first observer from viewing a scene;
   capturing image data of a field of view of the scene using at least one camera located on a second side of the structure;
   using a computer processor, determining, based on the position of the first observer relative to the virtual window display, a first portion of the field of view that corresponds to a solid angle of the virtual window display subtended by the first observer,
   wherein the computer processor is configured to adjust at least one of a size and a position of the object relative to other parts of the scene in the displayed portion of the field of view based on the determined position of the first observer; and displaying the first portion of the field of view on the virtual window display, wherein the virtual window display mimics a view the first observer would have if the virtual window was a real window in the structure.

16. The method of claim 15, wherein the virtual window display comprises a lenticular lens array over a display screen.

17. The method of claim 16, further comprising: determining a position of a second observer relative to the virtual window display; using the computer processor, determining, based on the position of the second observer relative to the virtual window display, a second portion of the field of view that corresponds to a second solid angle of the virtual window display subtended by the second observer; and displaying the first portion and the second portion of the field of view on the virtual window display such that the first portion is viewable from the position of the first observer and the second portion is viewable from the position of the second observer, wherein the virtual window display mimics views the observers would have if the virtual window was a real window in the structure.

18. The method of claim 17, wherein displaying the first portion of the field of view comprises displaying the first portion of the field of view using pixel columns of the lenticular lens array viewable from the first observer's position, wherein displaying the second portion of the field of view comprises displaying the second portion of the field of view using different pixel columns of the lenticular array visible from the second observer's position.

19. The method of claim 15, wherein the scene comprises at least one object, wherein the computer processor is configured to adjust at least one of a size and a position of the object relative to other parts of the scene in the displayed first portion of the field of view based on the determined position of the first observer.

20. The method of claim 19, further comprising obtaining secondary image data of the scene, wherein adjusting at least one of the size and the position of the object creates a gap in the displayed first portion of the field of view, wherein the computer processor is configured to fill in the gap using the secondary image data.

21. The method of claim 15, wherein the scene comprises at least one object, wherein the computer processor is configured to adjust at least one of a size and a position of the object in the displayed first portion of the field of view based on the determined position of the first observer.

22. The method of claim 21, further comprising obtaining secondary image data of the scene, wherein adjusting at least one of the size and the position of the object creates a gap in the displayed first portion of the field of view, wherein the computer processor is configured to fill in the gap using the secondary image data.

23. A virtual window system comprising:
a virtual window display located on a first side of a structure obstructing an observer from viewing a scene;
a position sensor configured to determine a position of an observer relative to the virtual window display;
at least one camera configured to capture image data of a field of view of a scene, the at least one camera positioned on a second side of the structure;
a computer processor configured to determined, based on the position of the observer relative to the virtual window display, a portion of the field of view that corresponds to a solid angle of the virtual window display subtended by the observer,
wherein the computer processor is configured to adjust at least one of a size and a position of the object relative to other parts of the scene in the displayed portion of the field of view based on the determined position of the first observer;
and the virtual window display configured to display the portion of the field of view on the virtual window display such that the virtual window display mimics a view the observer would have if the virtual window was a real window through the structure.

24. The system of claim 23, wherein the virtual window display comprises a lenticular lens array over a display screen.

25. The system of claim 23, wherein the scene comprises at least one object, wherein the computer processor is configured to adjust at least one of a size and a position of the object in the displayed portion of the field of view based on the determined position of the first observer.

26. The system of claim 25, wherein the system is configured to obtain secondary image data of the scene, wherein adjusting at least one of the size and the position of the object creates a gap in the displayed first portion of the field of view, wherein the computer processor is configured to fill in a gap using the secondary image data.

* * * * *